N. WASHBURN.
Car-Wheel.
No. 197,304.  Patented Nov. 20, 1877.
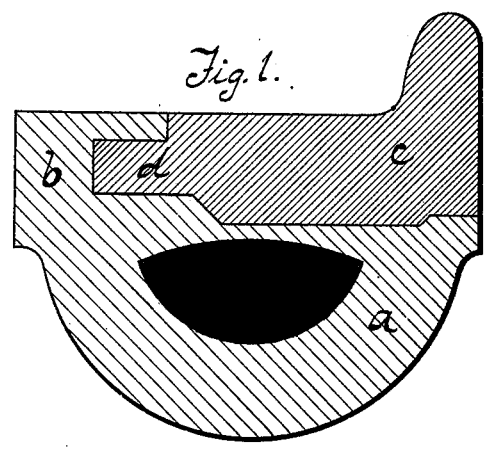
Witnesses:
Rob't J Gaylord
Lewis Sperry
Inventor:
N. Washburn,
By W.E. Simonds
atty

UNITED STATES PATENT OFFICE.

NATHAN WASHBURN, OF HARTFORD, CONNECTICUT.

IMPROVEMENT IN CAR-WHEELS.

Specification forming part of Letters Patent No. 197,304, dated November 20, 1877; application filed September 6, 1877.

*To all whom it may concern:*

Be it known that I, NATHAN WASHBURN, of Hartford, in the county of Hartford and State of Connecticut, have invented certain new and useful Improvements pertaining to Car-Wheels, of which the following is a specification, reference being had to the accompanying drawing, where the figure is a cross-section of the rim of a car-wheel made according to my present invention.

The body of the wheel $a$, whether spoked or solid, is of cast-iron. A portion of the rim $b$ is also of the same metal, cast at the same time, and in one piece, with the body $a$. The remaining portion of the rim or tire $c$ is of steel. This portion comprehends the flange and that part of the tread which usually rides upon the rail. In actual use the outer portion of the tread rarely rides in contact with the rail, so that it does not need to be made of the harder material—steel.

The advantages of a wheel constructed as thus far described are set forth in Letters Patent to me, No. 191,292, dated May 29, 1877.

My present invention consists in forming upon the side of the steel portion (by casting) spines or projections $d$, more or less in number, which, in the process of casting the iron, are enveloped by the iron. It will be readily seen that these spines or projections, thus enveloped by the iron, form an additional means of holding the iron and steel parts firmly together, and that these steel projections greatly strengthen the iron. I have to add that, when the steel part is cast to shape, there are advantages incident to leaving these spines. I have devised a mold for casting a steel tire part with these spines, which is reserved as subject-matter of other Letters Patent. In saying that the spines are "enveloped" by the iron, I do not mean that the iron must wholly cover the spines, for, obviously, they may run to the side of the wheel.

The wheel is produced by first making the steel part, and then placing it in another mold and casting the iron part, the two metals welding or fusing together.

I claim as my invention—

A car-wheel having the comparatively-unused portion $b$ of the tread of cast-iron, and the other portion, $c$, of the tread of another metal, as steel, bearing the lateral projections $d$ cast thereupon and enveloped by the iron in the process of casting, all substantially as herein described.

N. WASHBURN.

Witnesses:
WM. E. SIMONDS,
ROBT. F. GAYLORD.